United States Patent
Giri

(12) 
(10) Patent No.: US 6,221,128 B1
(45) Date of Patent: Apr. 24, 2001

(54) RECOVERY AND REMOVAL OF MERCURY FROM EFFLUENT

(76) Inventor: Brij P. Giri, 36725 Lamarra Dr., Sterling Heights, MI (US) 48310

( * ) Notice: Subject to any disclaimer, the term of this patent is extended or adjusted under 35 U.S.C. 154(b) by 0 days.

(21) Appl. No.: 09/102,531

(22) Filed: Jun. 22, 1998

Related U.S. Application Data

(60) Provisional application No. 60/050,334, filed on Jun. 20, 1997.

(51) Int. Cl.$^7$ .................................................... C22B 43/00
(52) U.S. Cl. ............................ 75/742; 423/101; 210/914
(58) Field of Search ............................... 75/742; 423/101; 210/914

(56) References Cited

U.S. PATENT DOCUMENTS

| | | | |
|---|---|---|---|
| H715 | 12/1989 | Greenhalgh . | |
| 3,764,528 | * 10/1973 | Cadmus | ................................. 210/50 |
| 4,060,410 | * 11/1977 | Laszlo | ................................. 75/724 |
| 4,946,669 | * 8/1990 | Siegfried et al. | ........................ 424/4 |
| 5,508,175 | * 4/1996 | Slifkin | ................................. 435/40.5 |
| 5,607,870 | * 3/1997 | Lipton | ................................. 436/176 |
| 5,785,935 | * 7/1998 | Fristad et al. | ........................ 423/742 |
| 5,902,376 | * 5/1999 | Currie | ................................. 75/742 |

* cited by examiner

*Primary Examiner*—Jill Warden
*Assistant Examiner*—Tima McGuthry-Banks
(74) *Attorney, Agent, or Firm*—Plunkett & Cooney, P.C.

(57) ABSTRACT

Mercury salt-containing discharge effluents such as from B-5 fixatives and PVA fixatives are treated to remove mercury therefrom. The present method contemplates plates the addition of aluminum to the effluent to cause the precipitation of elemental mercury therefrom. The remaining effluent, after precipitation, can be decanted and post treated while recovering precipitated elemental mercury. The decanted effluent, once subjected to post treatment, by first rendering the effluent highly basic, is the neutralized. Neutralization causes the precipitation of sodium chloride. A water conditioner is then added thereto. Subsequently, the so-treated decanted effluent is then filtered through a filtering medium such as filter paper or the like. A second filtration step may then be carried out by passing the so-filtered effluent through a mixed bed or through a filter paper.

13 Claims, No Drawings

RECOVERY AND REMOVAL OF MERCURY FROM EFFLUENT

CROSS REFERENCE TO RELATED APPLICATIONS

This application claims the benefit of U.S. provisional application Ser. No. 60/050,334 filed Jun. 20, 1997 for Recovery And Removal of Mercury from Effluent, the disclosure of which is hereby incorporated by reference.

STATEMENT REGARDING FEDERALLY SPONSORED RESEARCH

Not applicable.

BACKGROUND OF THE INVENTION

1. Field of the Invention

The present invention pertains to purification and clarification of effluents. More particularly, the present invention pertains to the recovery of mercury from mercury-containing effluent. Even more particularly, the present invention concerns the recovery and removal of elemental mercury from mercury salt-containing effluents.

2. Prior Art

As is known to those skilled in the art to which the present invention pertains, mercury is a highly poisonous element the presence of which in water, either in an elemental or combined state, creates an environmentally hazardous situation. Yet, mercury is a highly valued commercial compound deployed in a multitude of situations, e.g. photography, production of caustic soda, clinical laboratories, etc. Thus, the disposal of spent mercury is an issue which needs to be addressed continuously in a commercial environment since spent mercury is, today, deposited in land fills or otherwise disposed of in potentially hazardous modes.

The present invention, as detailed below, provides a method for recovering elemental mercury from effluents in an efficient manner and which permits substantially total recovery therefrom.

SUMMARY OF THE INVENTION

The process is carried out, preferably, at room temperature under normal ambient conditions. Usually, the aluminum is introduced as sheets or foil which is added to the effluent with stirring at about 10 to about 200 rpm. The aluminum is introduced in molar excess amounts ranging from about 1.5 to about 2.0 molar excess per anion in the mercury-containing salt. Usually, the reaction will be complete in about 12 hours. Subsequent post-treatment of the effluent may be effected to remove trace amounts of mercury remaining in the effluent.

For a more complete understanding of the present invention reference is made to the following detailed description and accompanying examples.

DESCRIPTION OF THE PREFERRED EMBODIMENT

As noted above, in accordance with the present invention cationic mercury is removed from an effluent by a reaction which enables the precipitation of elemental mercury therefrom. The present invention more particularly removes mercury chloride and other mercury salts such as mercury sulfate, mercury acetate, mercury nitrate and the like from such mercury salt-containing effluent by the precipitation of mercury therefrom.

The present invention is achieved by introducing aluminum into mercury salt-containing effluent to cause the precipitation therefrom of elemental mercury. The aluminum reacts with the mercury salt to free the mercury, as described below. The mercury, precipitates out of the water, as elemental mercury and is recovered therefrom.

In practicing the present invention, the aluminum is introduced into the solution in any convenient form and, preferably, as aluminum foil. Aluminum foil is of the type which is well-known and commercially available and may be of any suitable grade and suitable thickness including domestic or consumer grade as well as thin, industrial aluminum foil.

Preferably, and in order to provide sufficient surface area for the reaction between the aluminum and the mercury-containing salt, minute pieces of the foil are introduced into the aqueous effluent. Preferably, the minute pieces have a minimize size of from about 1 to about 2 $cm^2$. Of course, it is to be understood that the size of the aluminum foil pieces is not critical hereto only that there be sufficient amounts thereof to provide adequate surface area for the reaction to proceed.

The process is carried out, preferably, at room temperature and pressure, under normal ambient conditions. Typically, the mercury salt-containing effluent -solution has the aluminum foil added thereto with stirring. Typically, stirring will take place at from about 10 rpm to about 200 rpm, and, preferably, from about 25 rpm to about 100 rpm depending on the volume of water to be treated.

Ordinarily, and, again, depending on the quantity of water to be treated the reaction will proceed and be completed in a time period ranging from about one to about 12 hours. The amount of aluminum to be added to the waste water is in excess of stochiometric requirements so that the amount of available aluminum for reaction with the mercury salt is in excess of that which is required under stochiometric conditions. Typically, generally from about 1.5 to about 2.0 molar excess amounts of aluminum is present per anion in the mercury-containing salt.

In carrying out the reaction, the mercury precipitates out from a reaction vessel, as elemental mercury, which after decanting, can be recovered and washed several times. It is contemplated that by practicing the present invention that at least 99.9 percent of mercury present in any effluent as a salt can be recovered, if sufficient aluminum foil is added thereto.

The present invention is contemplated as being useful in connection with any effluent which contains a mercury salt and has particular utility in the removal and recovery of mercury from B-5 fixatives, PVA fixative, Schaudian's fixative, as well as from environmental contaminant containing bodies such as bodies of water and soil or other sources containing mercury chloride in the mercuric form. However, the present invention will also be useful with mercurous forms of the cation, as denoted hereinabove.

Although not wishing to be bound by any theory it appears that when the aluminum is added to the mercury salt containing water there is formed mercury-aluminum amalgam which frees the anionic ion of the mercury salt, and which remains in the water phase.

The mercury-aluminum amalgam, itself, appears to decompose into elemental mercury, aluminum hydroxide and aluminum oxide in the effluent. The aluminum being an electron donor donates its electrons to the mercury ions, as measured by the electromotive forces, to form the elemental mercury. Moreover, the thus formed aluminum ion reacts with the water to form the hydroxide and oxide in solution. Thus, within the effluent, upon introduction of the aluminum, elemental mercury and a mercury-aluminum oxide are being formed. As the reaction proceeds to final, all of the aluminum is consumed.

It appears that there is an equilibrium reaction in the effluent as follows:

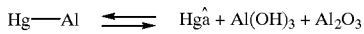

where there exists about 0.003%, by weight, of amalgam and about 99.997% of elemental mercury.

Thus, as the reaction proceeds the elemental mercury precipitates out of solution.

It should be noted that the time for the reaction to proceed can be accelerated by carbonyl addition to the effluent such as by aldehyde or ketone addition. Suitable aldehydes include, for example, formaldehyde, acetaldehyde, propionaldehyde, and so forth, as well as mixtures thereof. Suitable keatones include, for example, acetone, methyl ethyl ketone, ethyl ketone, and so forth, as well as mixtures thereof Generally, from about 0.5 to about 5.0 parts, by volume, per 100 parts, by volume, of water in the effluent, and, preferably, about 1 to about 4 parts, by volume, of carbonyl-containing compound per 100 parts, by volume, of water in the effluent is employed, when used.

Where used, the preferred carbonyl-containing compound is formaldehyde, especially where the effluent is a mercury chloride-containing effluent.

After the reaction with the foil is completed, the effluent is decanted and the elemental mercury is recovered.

Because the reaction does not recover 100 percent of the mercury, where necessary, further treatment of the decanted effluent may be conducted. In such instances, the effluent water is first rendered alkaline by introducing a quantity of alkaline material such as caustic soda, potassium hydroxide, sodium carbonate or the like into the water to raise the pH of the water to a pH ranging from about 11.5 to about 12 or greater to neutralize any acid or free ions, such as metal chloride ions, in the effluent and to promote precipitation the mercury. Thereafter, a quantity of weak organic or mineral acid, such as phosphoric acid, citric acid, acetic acid, tartaric acid, or the like, as well as mixtures thereof, is added thereto to bring the pH of the system back to about neutral, i.e. pH of about 7. It is theorized that the alkaline material addition causes the formation of neutral salts, e.g. NaCl, and the promotion of the precipitation of residual elemental mercury and aluminum oxide from the effluent. It is believed that by neutralizing the effluent with the acid that the elemental mercury will then complex with the anion of the acid. The so-formed salt can, then, be removed by filtration.

A flocculant or water conditioner, including polyelectrolytes such as a polyacrylate or the like, may then be added to the water as a clarifier thereof to promote the precipitation of minute particles remaining in the decanted water, as noted hereinabove.

Generally, from at least about 1 to about 2 parts or more, by weight, of the flocculant is added to the water per one million parts per million of the water.

In the post-treatment of the water to recover residual mercury, generally from about 5.0 to about 75 parts of the alkaline material, per million parts of water is sufficient amount to raise the pH to about 11.5 to 12. Similarly, sufficient amounts of the acid are used to neutralize the effluent, i.e. bring the pH back to about 7 and, generally, 6.5 to 7.5.

The so-treated effluent is, thus, filtered through any suitable filtering medium of minimal micron porosity, such as a filter paper, to filter out the so-formed mercury salts as well as any aluminum oxide precipitate. The so-filtered effluent may, then, be further treated to ensure substantially 100 percent removal of mercury.

Thus, the effluent may be further post-treated through a further or second filtration. Preferably, the effluent is further treated by passing the effluent through a mixed bed filter or filtering medium. Generally, the mixed bed medium comprises a mixture of (a) aluminum, preferably, deployed as granular aluminum, (b) activated carbon, such as charcoal, (c) an ion exchange resin comprising a cationic exchange resin, an anionic exchange resin and mixtures thereof, and (d) silicon dioxide, preferably, present as sand or glass beads.

The components of the mixed bed are mixed together to form a uniform homogeneous mix. The mixed bed is housed in any suitable container therefor. The effluent is fed through the container by any suitable means such as by gravity feed, pumping or the like. Generally, the effluent has a dwell or contact time with the filtering medium of between 1/2 to about 12 hours, and, preferably, from about 3 to 4 hours.

The so-obtained discharge from the housing is substantially 100 percent free of mercury.

The present invention can be more clearly understood by reference to the following illustrative examples. In the examples all parts are by weight, absent indications to the contrary. It is to be understood that the following examples are for illustrative purposes and are not to be deemed as limitative of the present invention.

EXAMPLE I

At room temperature, and into a suitable reaction vessel equipped with stirring means was added 20 parts of B-5 fixative, which is a common fixative comprising water, 1.16 parts mercury chloride and 0.2 parts sodium acetate per 100 parts of fixative.

Thereafter, 20 parts of deionized water was added to the 20 parts of fixative to form a 40 part 1:1 dilution solution. A quantity of aluminum foil, introduced as 2 cm$^2$ small pieces of foil which is domestically available under the mark Reynolds Wrap® was then added to the solution with stirring at 100 rpm for about ten hours. Upon the addition, an immediate reaction was observed on the surface of the foil particles. The reaction was permitted to proceed. At the end of a ten hour period, elemental mercury had precipitated out.

The effluent water was removed and the remaining mercury precipitate was washed several times with deionized water. It was determined by weighing that 0.85 parts of elemental mercury was recovered representing a theoretical recovery of 99.998 percent.

EXAMPLE II

Following the procedure of Example I, 12.5 parts of mercury chloride were dissolved in 400 parts of deionized water. One hundred parts of the so-prepared solution was, then, placed into a separate vessel equipped with stirring means. To this was added 0.465 parts of aluminum foil, present as 1 to 2 cm$^2$ pieces of consumer grade Reynolds Wrap®. The aluminum foil-containing solution was then stirred at ambient conditions, for a period for about ten hours. Thereafter, the water was decanted from the beaker leaving a residue of precipitated elemental mercury and some residual amalgam.

Upon removal of the water, the shiny amalgam, still present within the vessel, continued to react with atmospheric oxygen to give aluminum oxide and elemental mercury. The reaction was permitted to continue until the reaction stopped. The residue was, then, washed with water and weighed to recover the mercury. The mercury was recovered in an amount of 2.29 parts representing recovery of 99.998 percent of the theoretical.

EXAMPLE III

The procedure of Example II was repeated except that 1.05 parts of iron, as a fine powder, was added to the 100 parts of the mercury chloride solution in lieu the aluminum foil. No mercury was recovered.

Thereafter 0.465 parts of aluminum foil was added to the iron-containing mercury chloride solution and stirring was continued for 24 hours at ambient conditions. Thereafter, the light precipitate was removed and the recovered mercury was washed several times with water. Two and one tenth parts of mercury were recovered.

It was detected that some aluminum was in the core of the mercury and when exposed to water, aluminum oxide or hydroxide was formed.

EXAMPLE IV

The procedure of Example I was repeated except that the test solution was a mixture of polyvinyl alcohol and mercuric chloride.

Into a suitable beaker equipped with stirring means was added 50 parts of the solution which contained 2.25 parts mercury chloride to which was added two times the molar excess of about 2 $cm^2$ pieces of aluminum foil. The vessel was stirred at 100 rpm at room temperature for 24 hours and elemental mercury was recovered. One and sixty-six hundredths parts of elemental mercury was recovered representing 99.98 percent of the theoretical amount.

It is to be appreciated from the preceding that the present invention provides an efficient method for recovery elemental mercury from spent effluent.

Having thus, described the invention what is claimed is:

1. A method for removing mercury from a mercury salt-containing effluent comprising:
   (a) adding aluminium to the mercury-containing effluent to precipitate elemental mercury therefrom;
   (b) recovering the mercury precipitate from the effluent leaving a mercury-containing residual effluent, and
   (c) post-treating the residual effluent by the following steps:
      (1) rendering the residual effluent alkaline;
      (2) neutralizing the effluent of step (1) to a pH of about 7 by the addition of an acidic compound thereto;
      (3) adding a flocculant to the effluent obtained from step (2), and
      (4) thereafter, filtering the effluent obtained from step (3) through a first filtering medium to remove residual mercury therefrom.

2. The method of claim 1 wherein the aluminum is added with stirring at a rate of from about 10 to about 200 rpm.

3. The method of claim 1 wherein the aluminum comprises aluminum foil having a size from about 1 to about 2 $cm^2$.

4. The method of claim 1 wherein the aluminum is added in molar excess ranging from about 1.5 to about 2.0 per anion in the mercury-containing salt.

5. The method of claim 1 wherein the mercury is present as cationic mercury.

6. The method of claim 1 which further comprises adding a carbonyl-containing compound to the effluent.

7. The method of claim 6 wherein the carbonyl-containing compound is selected from the group consisting of addehydes, ketones and mixtures thereof.

8. The method of claim 7 wherein the carbonyl-containing compound is present in an amount ranging from about 0.5 to about 5.0 parts, by volume, per hundred parts, by volume, of water in the effluent.

9. The method of claim 1 which further: comprises passing the filtered effluent through a second filtered medium.

10. The method of claim 1 wherein the aluminum comprises an aluminum foil.

11. The method of claim 1 wherein the effluent is a B-5 fixative containing effluent.

12. The method of claim 1 wherein the effluent is a PVA fixative containing effluent.

13. A method of recovering elemental mercury from a mercury salt-containing effluent, comprising:
   (a) adding aluminum and a reaction accelerator consisting essentially of a carbonyl compound to the effluent to precipitate elemental mercury therefrom.

* * * * *